(12) United States Patent
Wang

(10) Patent No.: US 6,992,143 B2
(45) Date of Patent: Jan. 31, 2006

(54) CURABLE PERFLUOROELASTOMER COMPOSITION

(75) Inventor: Shuhong Wang, Hockessin, DE (US)

(73) Assignee: DuPont Dow Elastomers LLC, Wilmington, DE (US)

(*) Notice: Subject to any disclaimer, the term of this patent is extended or adjusted under 35 U.S.C. 154(b) by 40 days.

(21) Appl. No.: 10/863,037

(22) Filed: Jun. 8, 2004

(65) Prior Publication Data

US 2005/0038165 A1    Feb. 17, 2005

Related U.S. Application Data

(60) Provisional application No. 60/495,613, filed on Aug. 15, 2003.

(51) Int. Cl.
*C08K 5/21* (2006.01)

(52) U.S. Cl. .................. 525/326.3; 526/247; 526/250; 526/254; 524/279

(58) Field of Classification Search ............ 525/326.3; 526/247, 250, 254; 524/279
See application file for complete search history.

(56) References Cited

U.S. PATENT DOCUMENTS

| | | | | |
|---|---|---|---|---|
| 4,281,092 A | * | 7/1981 | Breazeale | ................... 526/247 |
| 4,624,971 A | * | 11/1986 | van Tao et al. | ............... 522/37 |
| 5,696,189 A | | 12/1997 | Legare | |
| 5,756,568 A | * | 5/1998 | Morita et al. | ............... 524/268 |
| 6,114,452 A | * | 9/2000 | Schmiegel | ................. 525/194 |
| 6,191,208 B1 | * | 2/2001 | Takahashi | ................... 524/494 |
| 6,211,319 B1 | | 4/2001 | Schmiegel | |
| 6,281,296 B1 | * | 8/2001 | MacLachlan et al. | ..... 525/326.3 |
| 6,887,927 B2 | * | 5/2005 | Grootaert et al. | ........... 524/167 |

FOREIGN PATENT DOCUMENTS

| | | |
|---|---|---|
| EP | 636663 A2 * | 2/1995 |
| EP | EP 0636663 A | 2/1995 |
| EP | 656391 A2 * | 6/1995 |
| EP | EP 0656391 A2 | 6/1995 |
| EP | 1033387 A2 * | 9/2000 |
| EP | EP 1 033 387 B1 | 9/2000 |
| WO | WO 01/27194 A1 | 4/2001 |

OTHER PUBLICATIONS

Roger Grant and Claire Grant, "Grant & Hackh's Chemical Dictionary", 1987 edition, McGraw-Hill, see pp. 31-32.*
Gessner G. Hawley, "Hawley's Condensed Chemical Dictionary", 1987 edition, Van Nostrand Reinhold, see p. 1038.*
Derwent Abstract—Japanese Patent Application Kokai 7138014, published May 30, 1995.

* cited by examiner

*Primary Examiner*—David W. Wu
*Assistant Examiner*—Henry S. Hu

(57) ABSTRACT

A non-black filled perfluoroelastomer composition comprising a) a perfluoroelastomer having nitrile group cure sites, b) a curative selected from the group consisting of i) a bis (aminophenol) and ii) a compound that decomposes at curing temperatures to generate ammonia and c) 1–25 phr hydrophobic silica filler. Cured compositions have surprisingly better compression set than do similar compounds containing hydrophilic silica.

7 Claims, No Drawings

CURABLE PERFLUOROELASTOMER COMPOSITION

CROSS-REFERENCE TO RELATED APPLICATIONS

This application claims the benefit of U.S. Provisional Application No. 60/495,613 filed Aug. 15, 2003.

FIELD OF THE INVENTION

This invention relates to perfluoroelastomer compositions comprising a) perfluoroelastomer, b) a curative selected from the group consisting of an ammonia generating curative and a bis(aminophenol), and c) hydrophobic silica filler.

BACKGROUND OF THE INVENTION

Perfluoroelastomers have achieved outstanding commercial success and are used in a wide variety of applications in which severe environments are encountered, in particular those end uses where exposure to high temperatures and aggressive chemicals occurs. These polymers are often used in seals for aircraft engines, in oil-well drilling devices, in semiconductor wafer manufacturing processes and in sealing elements for industrial equipment used at high temperatures.

Many perfluoroelastomer seals are filled with carbon black. However, an increasing number of end use applications require non-black seals. White fillers such as silica, barium sulfate, alumina and aluminum silicate are generally employed for such applications (U.S. Pat. Nos. 5,696,189 and 6,191,208 B1).

There are several different types of curing systems available for crosslinking perfluoroelastomers. Particularly preferred systems are i) bis(aminophenol)s (U.S. Pat. No. 6,211,319) and ii) compounds which decompose at curing temperatures to generate ammonia. It is believed that the ammonia reacts with nitrile group cure sites located on the perfluoroelastomer polymer chains to produce triazine rings, thus crosslinking the perfluoroelastomer (U.S. Pat. No. 6,281,296 and WO 200127194).

It would be desirable to have a non-black filled perfluoroelastomer composition which is curable with either a bis(aminophenol) or an ammonia generator compound and which yields a cured article having good physical properties, including compression set resistance.

SUMMARY OF THE INVENTION

The present invention is directed to a curable perfluoroelastomer composition that, when cured, has good physical properties, particularly good (i.e. low) compression set. Accordingly, an aspect of the present invention is a curable composition comprising A. a perfluoroelastomer comprising copolymerized units of (1) tetrafluoroethylene, (2) a perfluoro(vinyl ether), and (3) a cure site monomer selected from the group consisting of nitrile-containing fluorinated olefins and nitrile-containing fluorinated vinyl ethers;

B. 1–25 parts by weight per hundred parts by weight perfluoroelastomer of a hydrophobic silica; and C. a curative selected from the group consisting of i) a bis(aminophenol) and ii) a compound that decomposes at temperatures between 40° and 330° C. to produce ammonia.

DETAILED DESCRIPTION OF THE INVENTION

The compositions of the present invention are based on elastomeric perfluoropolymers (hereinafter "perfluoroelastomers"), that is, substantially fully fluorinated fluoropolymers which, when cured, exhibit an elastomeric character. The perfluoroelastomers contain nitrile groups which render the polymers crosslinkable by ammonia and bis(aminophenols).

Perfluoroelastomers are polymeric compositions having copolymerized units of at least two principal perfluorinated monomers. Generally, one of the principal comonomers is a perfluoroolefin, while the other is a perfluoro(vinyl ether). Representative perfluorinated olefins include tetrafluoroethylene (TFE) and hexafluoropropylene (HFP). Suitable perfluorinated vinyl ethers are those of the formula $$CF_2=CFO(R_f'O)_n(R_f''O)_mR_f \qquad (I)$$

where $R_f'$ and $R_f''$ are different linear or branched perfluoroalkylene groups of 2–6 carbon atoms, m and n are independently 0–10, and $R_f$ is a perfluoroalkyl group of 1–6 carbon atoms.

A preferred class of perfluoro(vinyl ethers) includes compositions of the formula $$CF_2=CFO(CF_2CFXO)_nR_f \qquad (II)$$

where X is F or $CF_3$, n is 0–5, and $R_f$ is a perfluoroalkyl group of 1–6 carbon atoms.

A most preferred class of perfluoro(vinyl ethers) includes those ethers wherein n is 0 or 1 and $R_f$ contains 1–3 carbon atoms. Examples of such perfluorinated ethers include perfluoro(methyl vinyl ether) (PMVE) and perfluoro(propyl vinyl ether) (PPVE). Other useful monomers include compounds of the formula $$CF_2=CFO[(CF_2)_mCF_2CFZO]_nR_f \qquad (III)$$

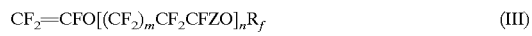

where $R_f$ is a perfluoroalkyl group having 1–6 carbon atoms, m=0 or 1, n=0–5, and Z=F or $CF_3$.

Preferred members of this class are those in which $R_f$ is $C_3F_7$, m=0, and n=1.

Additional perfluoro(vinyl ether) monomers include compounds of the formula $$CF_2=CFO[(CF_2CFCF_3O)_n(CF_2CF_2CF_2O)_m(CF_2)_p]$$
$$C_xF_{2x+1} \qquad (IV)$$

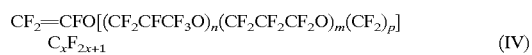

where m and n independently=1–10, p=0–3, and x=1–5.

Preferred members of this class include compounds where n=0–1, m=0–1, and x=1.

Another example of a useful perfluoro(vinyl ether) includes $$CF_2=CFOCF_2CF(CF_3)O(CF_2O)_mC_nF_{2n+1} \qquad (V)$$

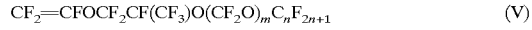

where n=1–5, m=1–3, and where, preferably, n=1.

Mixtures of perfluoro(vinyl ethers) may also be used.

Preferred perfluoroelastomers are composed of tetrafluoroethylene and at least one perfluoro(vinyl ether) as principal monomer units. In such copolymers, the copolymerized perfluorinated ether units constitute from about 15 mole percent to 65 mole percent (preferably 25 to 60 mole percent) of total monomer units in the polymer.

The perfluoropolymer further contains copolymerized units of at least one nitrile group-containing cure site monomer, generally in amounts of from 0.1–5 mole percent. The range is preferably between 0.3–1.5 mole percent. Suitable cure site monomers include nitrile-containing fluorinated olefins and nitrile-containing fluorinated vinyl ethers. Useful nitrile-containing cure site monomers include those of the formulas shown below.

$$CF_2=CF-O(CF_2)_n-CN \quad (VI)$$

where n=2–12, preferably 2–6;

$$CF_2=CF-O[CF_2-CFCF_3-O]_n-CF_2-CF(CF_3)-CN \quad (VII)$$

where n=0–4, preferably 0–2;

$$CF_2=CF-[OCF_2CF(CF_3)]_x-O-(CF_2)_n-CN \quad (VIII)$$

where x=1–2, and n=1–4; and $$CF_2=CF-O-(CF_2)_n-O-CF(CF_3)CN \quad (IX)$$

where n=2–4.

Those of formula (VIII) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \quad (X)$$

i.e. perfluoro(8-cyano-5-methyl-3,6-dioxa-1-octene) or 8-CNVE.

The perfluoroelastomers employed in this invention preferably comprise copolymerized units of i) 38.5 to 74.7 (most preferably 44 to 69.5) mole percent tetrafluoroethylene (TFE), ii) 25 to 60 (most preferably 30 to 55) mole percent perfluoro(methyl vinyl ether) (PMVE) and iii) 0.3 to 1.5 (most preferably 0.5 to 1.0) mole percent of a nitrile group—containing cure monomer, preferably 8-CNVE.

Perfluoroelastomers employed in this invention may be manufactured by such well-known processes as those described in Breazeale (U.S. Pat. No. 4,281,092) or Coughlin et. al. (U.S. Pat. No. 5,789,489).

Bis(aminophenols) which may be employed as curatives in the compositions of this invention include those of the formula

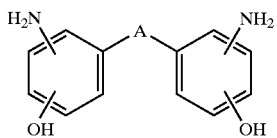

where A is $SO_2$, O, CO, alkyl of 1–6 carbon atoms, perfluoroalkyl of 1–10 carbon atoms, or a carbon-carbon bond linking the two aromatic rings. The amino and hydroxyl groups are interchangeably in the meta and para positions with respect to the group A. Preferably, the curing agent is a compound selected from the group consisting of 2,2-bis [3-amino-4-hydroxyphenyl]hexafluoropropane (diaminobisphenol AF or DABPAF). Alternatively, the hydroxyl groups may be replaced by thiol groups. The curing agents can be prepared as disclosed in U.S. Pat. No. 3,332,907 to Angelo. Diaminobisphenol AF can be prepared by nitration of 4,4'-[2,2,2-trifluoro-1-(trifluoromethyl)ethylidene] bisphenol (i.e. bisphenol AF), preferably with potassium nitrate and trifluoroacetic acid, followed by catalytic hydrogenation, preferably with ethanol as a solvent and a catalytic amount of palladium on carbon as catalyst. When present in the compositions of this invention, the bis(aminophenol) or bis(aminothiophenol) is typically at a level between 0.2 and 7 (preferably 1 to 2) phr (i.e. parts by weight per hundred parts by weight perfluoroelastomer).

Ammonia-generating compounds that may be employed in the compositions of this invention are those that are capable of generating ammonia at temperatures of 40° C.–330° C., preferably between 90° C.–220° C. Illustrative examples of these compounds include aldehyde ammonia condensation products, including acetaldehyde ammonia; and other compounds, such as hexamethylenetetramine; carbamates, for example t-butyl carbamate, benzyl carbamate, and $HCF_2CF_2CH(CH_3)OCONH_2$; urea; urea hydrochloride; thiourea; amides, such as phthalamide; metal ammine complexes, such as tetraamminecopper (II) sulfate hydrate; ammonia-Lewis acid adducts; carboxamides, such as oxamic acid; biuret; unsubstituted amidines, such as formamidine, formamidine hydrochloride, and formamidine acetate; and unsubstituted or substituted triazine derivatives such as those disclosed in WO 01/27194. When present in the compositions of this invention, the level of ammonia generating compound is generally from 0.05 to 5 phr, preferably 0.1–1 phr.

The compositions of the present invention also contain 1 to 25 (preferably 5 to 15) phr hydrophobic silica. Preferably, the average primary particle size of the silicas employed in the compositions of this invention is less than 100 nm, preferably 7 to 16 nm. By "hydrophobic silica" is meant silica that is not wetted by water. The number of silanol groups normally present on the surface of hydrophilic silica particles is greatly reduced on the surface of hydrophobic silica. Hydrophobic silica is typically made from hydrophilic silica by reaction of the surface silanol groups with an organosilane having between 1 and 3 alkyl groups and between 3 and 1 alkoxy or halogen groups, respectively. The alkyl groups do not contain any functional groups such as epoxy, amino, mercapto, vinyl or halogen groups. Examples of such silanes include, but are not limited to trimethoxymethylsilane, dimethyldichlorosilane, trimethylchlorosilane, octyltrichlorosilane, etc. Specific examples of hydrophobic silicas include, but are not limited to those having on their surface $(-O-)_2-Si-(CH_3)_2$, $-O-Si-(CH_3)_3$, or $(-O-)_3-Si-C_8H_{17}$ groups. Commercially hydrophobic silicas include Aerosil® R972, R974, R812 and R805 (Degussa Aktiengesellschaft, Frankfurt, Germany).

In an alternative embodiment of the invention, an organosilane described above, may be added to a perfluoroelastomer composition that contains a hydrophilic silica filler.

A hydrophobic inorganic filler such as hydrophobic $TiO_2$ or hydrophobic alumina may be used in addition to hydrophobic silica in the compositions of this invention. These hydrophobic fillers are made by reaction of the surface hydroxyl groups on the corresponding hydrophilic filler with an organosilane of the type described above. Alternatively, an organosilane as described above, may be added to a perfluoroelastomer composition that contains a hydrophilic inorganic filler such as $TiO_2$ or alumina.

Surprisingly, hydrophobic silica works better than hydrophilic silica of similar particle size and structure in the compositions of the invention to produce cured articles having good (i.e. low) compression set.

Additives, such as stabilizers, plasticizers, lubricants, other fillers, and processing aids typically utilized in perfluoroelastomer compounding can be incorporated into the compositions of the present invention, provided they have adequate stability for the intended service conditions. In particular, low temperature performance can be enhanced by incorporation of perfluoropolyethers.

The curable compositions of the present invention are useful in production of gaskets, tubing, and seals. Such articles are generally produced by molding a compounded formulation of the curable composition with various additives under pressure, curing the part, and then subjecting it to a post cure cycle. The cured compositions have excellent physical properties, including compressions set. They are particularly useful in applications such as seals and gaskets for manufacturing semiconductor devices, and in seals for high temperature automotive uses.

The invention is now illustrated by certain embodiments wherein all parts are by weight unless otherwise specified.

EXAMPLES

Test Methods

Cure Characteristics

Cure characteristics were measured using a Monsanto Moving Die Rheometer (MDR 2000) instrument under the following conditions:
Moving die frequency: 1.66 Hz
Oscillation amplitude: 0.5
Temperature: As specified in the Examples
Duration of test: As specified in the Examples
The following cure parameters were recorded:
$M_H$: maximum torque level, in units of dN·m
$M_L$: minimum torque level, in units of dN·m
$t_s2$: minutes to 2 units rise above $M_L$
$t_c90$: minutes to 90% of maximum torque Test specimens were prepared from elastomer compounded with appropriate additives, as described in the formulations listed in the Examples below. Compounding was carried out on a rubber mill. The milled composition was formed into a sheet and a sample was died out into a disk to form the test specimen.

Cure characteristics were determined by placing a test specimen in the sealed test cavity of the instrument which was maintained under a positive pressure and elevated temperature. A biconical disk was embedded in the test specimen and was oscillated through an arc of 0.5° at the specified frequency, thereby exerting a shear strain on the test specimen. The force at maximum amplitude (torque) required to rotate the disk is proportional to the stiffness (shear modulus) of the rubber. This torque was recorded as a function of time. Because stiffness of a rubber specimen increases during curing, the test provides a measure of curability. A test is completed when a predetermined time has elapsed. The time required to obtain a curve is a function of the test temperature and the characteristics of the rubber compound.

Tensile Properties

Unless otherwise noted, stress/strain properties were measured on K214 o-rings. Physical property measurements were obtained according to methods described in ASTM D1414. The following parameters were recorded:
$M_{100}$, modulus at 100% elongation in units of MPa
$T_B$, tensile strength at break in units of MPa.
$E_B$, elongation at break in units of %

Compression set of O-ring samples was determined in accordance with ASTM D1414.

The following perfluoroelastomer polymer was used in the Examples:
FFKM A—A terpolymer containing 68.2 mole percent units of TFE, 31.0 mole percent units of PMVE and 0.80 mole percent units of 8-CNVE was prepared according to the general process described in U.S. Pat. No. 5,789,489.

Control Examples 1–3

Control compositions of peroxide curable perfluoroelastomer compositions containing various types of silicas were mixed on a 16-inch mill. The formulations are shown in Table I.

Curing characteristics were measured at 177° C. for 15 minutes. O-rings were molded at 177° C. for 6 minutes and then post cured in an air oven at 232° C. for 6 hours. Tensile properties and compression set of o-rings were then measured according to the Test Methods. The results are shown in Table I. For these peroxide cured control compositions, compression set values were not improved by employing hydrophobic silica in place of hydrophilic silica.

TABLE I

|  | Control Example 1 | Control Example 2 | Control Example 3 |
|---|---|---|---|
| Formulation (phr) |  |  |  |
| FFKM A | 100 | 100 | 100 |
| Aerosil ® 200 VS[1] | 10 | 0 | 0 |
| Aerosil ® R972[2] | 0 | 10 | 0 |
| Aerosil ® 812[3] | 0 | 0 | 10 |
| Coagent[4] | 1.5 | 1.5 | 1.5 |
| Peroxide[5] | 3 | 3 | 3 |
| Tensile Properties |  |  |  |
| $M_{100}$ (MPa) | 7.9 | 6.6 | 5.8 |
| $T_B$ (MPa) | 16.7 | 16.3 | 12.3 |
| $E_B$ (%) | 162 | 181 | 160 |
| Compression Set @ 204° C., 70 hours | 39 | 41 | 47 |
| Cure Characteristics |  |  |  |
| ML (dN · m) | 6.16 | 6.21 | 4.14 |
| MH (dN · m) | 25.39 | 25.41 | 23.30 |
| Ts2 (minutes) | 0.93 | 0.93 | 1.17 |
| Tc90 (minutes) | 4.12 | 4.07 | 5.20 |

[1]hydrophilic silica (available from Degussa Aktiengesellschaft)
[2]hydrophobic silica (available from Degussa Aktiengesellschaft)
[3]hydrophobic silica (available from Degussa Aktiengesellschaft)
[4]tri(methallyl)isocyanurate (available from DuPont Dow Elastomers as Diak 8)
[5]PLC DBPH 68% (available from Elastochem, Inc.)

Examples 1–4 and Comparative Examples A and B

Test specimens were formulated according to the recipes shown in Table II. Cure characteristics were measured by MDR at 199° C. for 30 minutes. Tensile properties and compression set were tested on K214 O-rings that had been molded at 199° C. for 5 minutes longer than the T90 determined by MDR. The o-rings were then post cured in nitrogen at 305° for 26 hours (temperature was ramped slowly from room temperature to 305° C.). The results are also shown in Table II. The compositions of this invention (i.e. Examples 1 to 4) containing hydrophobic silica had much better (i.e. lower) compression set values than similar compositions (Comparative Examples A and B) that contained hydrophilic silica. Compositions of the invention containing hydrophobic silica also had better curing characteristics than the comparative compositions containing hydrophilic silica. The MDR curves of the comparative compositions showed reversion (i.e. decreasing torque, indicative of lowering of cure state, after $M_H$ was reached), whereas MDR curves of the compositions of the invention did not show reversion.

TABLE II

|  | Example 1 | Example 2 | Example 3 | Comparative Example A | Example 4 | Comparative Example B |
|---|---|---|---|---|---|---|
| Formulation (phr) | | | | | | |
| FFKM A | 100 | 100 | 100 | 100 | 100 | 100 |
| Aerosil ® R972[1] | 10 | 0 | 0 | 0 | 10 | 0 |
| Aerosil ® R974[1] | 0 | 10 | 0 | 0 | 0 | 0 |
| Aerosil ® R812[1] | 0 | 0 | 10 | 0 | 0 | 0 |
| Aerosil ® 200 VS[2] | 0 | 0 | 0 | 10 | 0 | 10 |
| DABPAF[3] | 1.75 | 1.75 | 1.75 | 1.75 | 0 | 0 |
| Urea | 0 | 0 | 0 | 0 | 0.3 | 0.3 |
| Tensile Properties | | | | | | |
| $M_{100}$ (MPa) | 4.1 | 4.4 | 3.8 | 7.6 | 2.4 | 4.2 |
| $T_B$ (MPa) | 9.0 | 13.5 | 12.8 | 12.9 | 7.0 | 7.5 |
| $E_B$ (%) | 161 | 195 | 214 | 161 | 204 | 199 |
| Compression Set @ 204° C., 70 hours | 29 | 35 | 44 | 55 | 15 | 38 |
| Compression Set @ 300° C., 70 hours | 49 | 53 | 65 | 81 | Cracked | 82 |
| Cure Characteristics | | | | | | |
| ML (dN · m) | 3.81 | 4.10 | 3.39 | 5.35 | 4.20 | 7.55 |
| MH (dN · m) | 16.60 | 16.89 | 14.57 | 17.54 | 15.96 | 19.61 |
| Ts2 (minutes) | 2.92 | 1.81 | 2 | 1.75 | 1.10 | 0.88 |
| Tc90 (minutes) | 10.06 | 5.96 | 7.31 | 7.99 | 4.19 | 2.66 |
| Reversion | No | No | No | Yes | No | Severe |

[1] hydrophobic silicas (available from Degussa Aktiengesellschaft)
[2] hydrophilic silica (available from Degussa Aktiengesellschaft)
[3] diaminobisphenol AF

What is claimed is:

1. A curable composition comprising
   A. a perfluoroelastomer comprising copolymerized units of (1) tetrafluoroethylene, (2) a perfluoro(vinyl ether), and (3) a cure site monomer selected from the group consisting of nitrile-containing fluorinated olefins and nitrile-containing fluorinated vinyl ethers;
   B. 1–25 parts by weight per hundred parts by weight perfluoroelastomer of a hydrophobic silica; and
   C. a curative selected from the group consisting of i) a bis(aminophenol) and ii) a compound that decomposes at temperatures between 40° and 330° C. to produce ammonia.

2. A curable composition of claim 1 further comprising a filler selected from the group consisting of hydrophobic titanium dioxide and hydrophobic alumina.

3. A curable composition of claim 1 wherein said perfluoroelastomer comprises copolymerized units of 38.5 to 74.7 mole percent tetrafluoroethylene, 25 to 60 mole percent perfluoro(methyl vinyl ether) and 0.3 to 1.5 mole percent perfluoro(8-cyano-5-methyl-3,6-dioxa-1-octene).

4. A curable composition of claim 1 wherein said hydrophobic silica is present in an amount between 5 and 15 parts by weight per hundred parts by weight perfluoroelastomer.

5. A curable composition of claim 1 wherein said hydrophobic silica has on its surface hydrophobic functional groups selected from the group consisting of (—O—)$_2$—Si(CH$_3$)$_2$, —O—Si—(CH$_3$)$_3$, and (—O—)$_3$—Si—C$_8$H$_{17}$.

6. A curable composition of claim 1 wherein said bis(aminophenol) is 2,2-bis[3-amino-4-hydroxyphenyl]hexafluoropropane.

7. A curable composition of claim 1 wherein said compound that decomposes to produce ammonia is selected from the group consisting of acetaldehyde ammonia; hexamethylenetetramine; t-butyl carbamate; benzyl carbamate; HCF$_2$CF$_2$CH(CH$_3$)OCONH$_2$; urea; urea hydrochloride; thiourea; phthalamide; metal ammine complexes; oxamic acid; biuret; formamidine; formamidine hydrochloride; and formamidine acetate.

* * * * *